United States Patent
Houshuyama et al.

(10) Patent No.: US 12,358,045 B2
(45) Date of Patent: Jul. 15, 2025

(54) CUTTING POSITION CONTROL DEVICE (71) Applicant: TOSHIBA MITSUBISHI-ELECTRIC INDUSTRIAL SYSTEMS CORPORATION, Tokyo (JP)

(72) Inventors: Kazuhiro Houshuyama, Tokyo (JP); Kanzo Inaba, Tokyo (JP); Kiyoyuki Nobuoka, Kawasaki (JP); Kunitoshi Asada, Kawasaki (JP)

(73) Assignee: TMEIC CORPORATION, Tokyo (JP)

( * ) Notice: Subject to any disclaimer, the term of this patent is extended or adjusted under 35 U.S.C. 154(b) by 357 days.

(21) Appl. No.: 17/756,567

(22) PCT Filed: May 22, 2020

(86) PCT No.: PCT/JP2020/020295
§ 371 (c)(1),
(2) Date: May 27, 2022

(87) PCT Pub. No.: WO2021/234944
PCT Pub. Date: Nov. 25, 2021

(65) Prior Publication Data
US 2023/0001473 A1 Jan. 5, 2023

(51) Int. Cl.
*B22D 11/16* (2006.01)
*B21B 1/46* (2006.01)
(Continued)

(52) U.S. Cl.
CPC .......... *B22D 11/163* (2013.01); *B21B 1/463* (2013.01); *B22D 11/126* (2013.01); *B23D 36/0091* (2013.01)

(58) Field of Classification Search
CPC ..... B22D 11/126; B22D 11/16; B22D 11/163; B21B 1/46; B21B 1/463; B23D 36/0091
(Continued)

(56) References Cited

U.S. PATENT DOCUMENTS 6,449,996 B1   9/2002   Hirabayashi et al.

FOREIGN PATENT DOCUMENTS

CN    106493324 A    3/2017
EP    3305437 A1     4/2018
(Continued)

OTHER PUBLICATIONS

The excerption of Extended European search report issued on Jan. 25, 2024, in corresponding European patent Application No. 20936519. 6, 3 pages.
(Continued)

*Primary Examiner* — Kevin P Kerns
(74) *Attorney, Agent, or Firm* — XSENSUS LLP (57) ABSTRACT

A cutting position control device according to an embodiment includes an arithmetic processing circuit that receives an input of first data relating to a production schedule and material information of a material to be produced, uses the first data to calculate a first cutting position of a first cutter for a first slab cast by continuous casting equipment, generates a first parameter for setting the first cutting position for a control program introduced to a process control device, and determines whether or not to use a second cutter to further cut a second slab of a second length cut from the first slab based on the first parameter by comparing the second length and a first length set to be from a front end of the first slab to the first cutting position, wherein the second cutter is located downstream of the first cutter.

10 Claims, 6 Drawing Sheets

(51) Int. Cl.
*B22D 11/126* (2006.01)
*B23D 36/00* (2006.01)

(58) Field of Classification Search
USPC .................. 164/417; 29/527.6, 566.1; 72/203
See application file for complete search history.

(56) References Cited

FOREIGN PATENT DOCUMENTS

| | | |
|---|---|---|
| JP | 11-267709 A | 10/1999 |
| JP | 5862596 B2 | 2/2016 |

OTHER PUBLICATIONS

International Search Report and Written Opinion mailed on Jul. 14, 2020, received for PCT Application PCT/JP2020/020295, Filed on May 22, 2020, 8 pages including English Translation.

FIG. 6

CUTTING POSITION CONTROL DEVICE

CROSS-REFERENCE TO RELATED APPLICATION

The present application is based on PCT filing PCT/JP2020/020295, filed May 22, 2020, the entire contents of which is incorporated herein by reference.

TECHNICAL FIELD

An embodiment of the invention relates to a cutting position control device for a continuous casting equipment-connected rolling system.

BACKGROUND ART

A continuous casting equipment-connected rolling system that continuously performs the casting, rolling, and taking up of a slab is practically employed. Due to the introduction of production management systems using computers, continuous casting equipment-connected rolling systems contribute to the increase of productivity and can integrally manage from the input of materials to the product.

There are demands for such a continuous casting equipment-connected rolling system to improve the yield of the product and to further increase the productivity.

PRIOR ART DOCUMENTS

Patent Literature

[Patent Literature 1]
Japanese Patent Application H11-267709 (Kokai)

SUMMARY OF INVENTION

Technical Problem

The embodiment is directed to provide a cutting position control device that makes possible a continuous casting equipment-connected rolling system in which the yield of the product is improved.

Solution to Problem

A cutting position control device according to an embodiment of the invention includes an arithmetic processing circuit. The arithmetic processing circuit receives an input of first data including information relating to a production schedule and material information of a material to be produced, uses the first data to calculate a first cutting position of a first cutter for a first slab cast by continuous casting equipment, generates a first parameter for setting the first cutting position for a control program introduced to a process control device, and determines whether or not to use a second cutter to further cut a second slab of a second length cut from the first slab based on the first parameter by comparing the second length and a first length set to be from a front end of the first slab to the first cutting position, wherein the second cutter is located downstream of the first cutter. When the second length is equal to the first length or less than the first length, the arithmetic processing circuit sets the second slab to be fed to a next process without being cut by the second cutter; and when the second length is greater than the first length, the arithmetic processing circuit generates a second parameter for setting a cutting position for the second cutter to further cut the second slab.

Advantageous Effects of Invention

According to an embodiment, a cutting position control device is realized and makes possible a continuous casting equipment-connected rolling system in which the yield of the product is improved.

DESCRIPTION OF EMBODIMENTS

Various embodiments are described below with reference to the accompanying drawings.

The drawings are schematic or conceptual; and the relationships between the thickness and width of portions, the proportions of sizes among portions, etc., are not necessarily the same as the actual values. Also, the dimensions and proportions may be illustrated differently among drawings, even when the same portion is illustrated.

In the specification and drawings, components similar to those described previously or illustrated in an antecedent drawing are marked with the same reference numerals; and a detailed description is omitted as appropriate.

The configuration of a rolling system will now be described.

Figure 1:
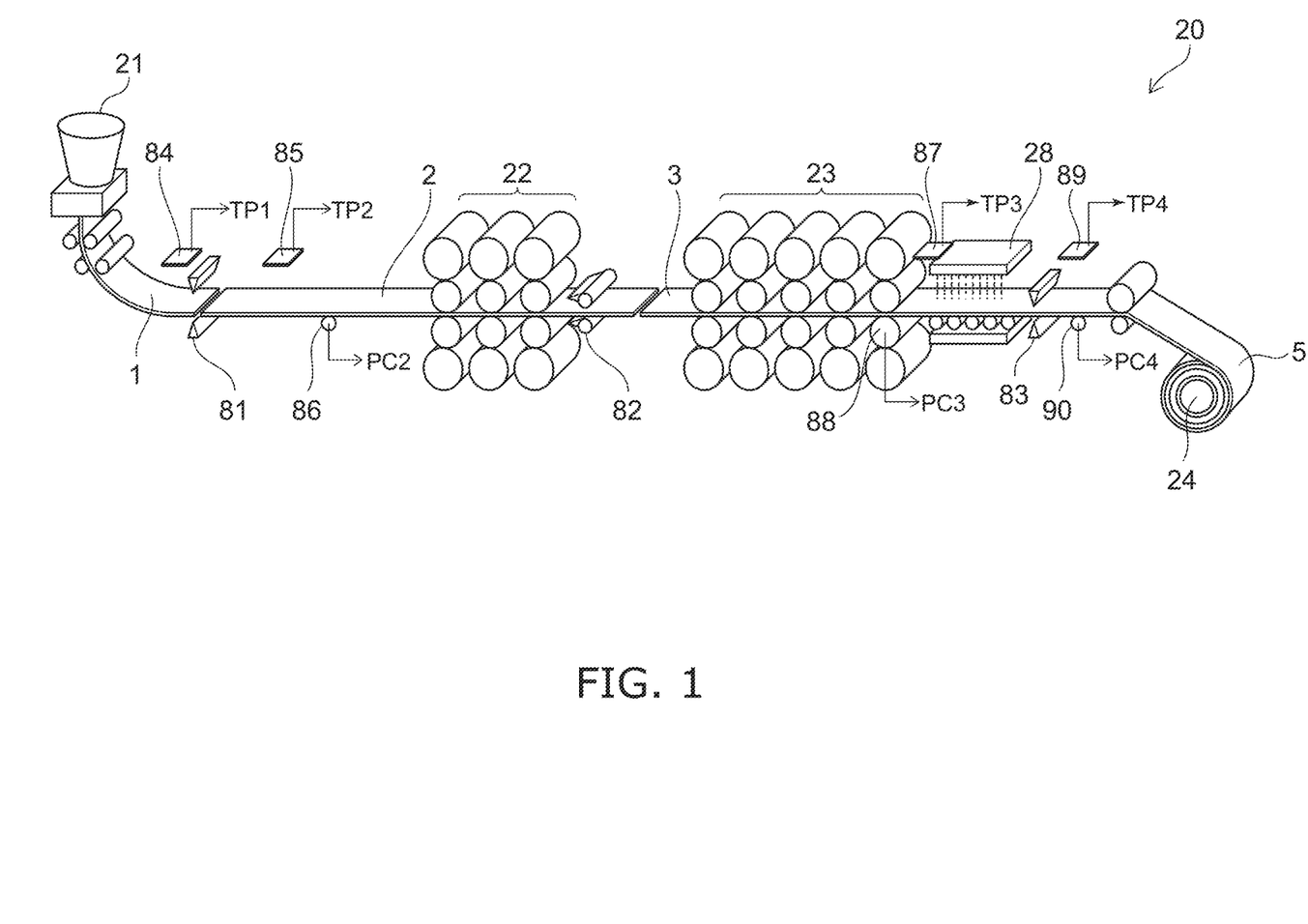
FIG. 1 is a schematic view illustrating a rolling system in which continuous casting equipment is connected.

FIG. 1 is a schematic view illustrating a rolling system in which continuous casting equipment is connected.

Although slabs 1 to 3 are drawn as being fed proximate to each other for convenience of description in FIG. 1, the slabs 1 to 3 are fed with appropriate spacing in an actual rolling system. Also, in reality, the thickness of the slab becomes thinner each time the slab passes through the rolling mill; however, the slabs are shown as having substantially the same thickness in FIG. 1 to eliminate complexity of illustration.

As shown in FIG. 1, the rolling system 20 includes continuous casting equipment 21, and rolling equipment connected to the continuous casting equipment 21. In the example, the rolling equipment includes a rough rolling mill 22, a finishing rolling mill 23, and a coiler 24. The example shows a configuration example of a hot rolling system; and the post processes of the finishing rolling include a runout table 28. The runout table 28 cools the material after the finishing rolling.

The rolling system 20 includes multiple cutters. Three cutters are used in the example. The multiple cutters are not limited to three; it is sufficient to provide two or more cutters. A first cutter is an upstream cutter 81. The upstream cutter 81 is located between the continuous casting equipment 21 and the rough rolling mill 22. A second cutter is an intermediate cutter 82. The intermediate cutter 82 is located between the rough rolling mill 22 and the finishing rolling mill 23. A third cutter is a downstream cutter 83. The downstream cutter 83 is located between the finishing rolling mill 23 and the coiler 24.

In the example, the upstream cutter 81 cuts a slab 1 dispatched from the continuous casting equipment 21 to a length corresponding to the length of the product. The cut slab 2 is transferred into the rough rolling mill 22.

The intermediate cutter 82 performs crop cutting of the front end and the tail end of the rough-rolled slab 3. The crop-cut slab 3 is transferred into the downstream cutter 83 after passing through the finishing rolling mill 23.

The downstream cutter 83 further cuts the slab based on the difference between the length of the slab set according to the production schedule and the length of the slab cut by the upstream cutter 81. The cut slab is taken up by the coiler 24. The taken-up slab forms a coil. According to the length that is cut by the upstream cutter 81, there are also cases where the downstream cutter 83 does not cut the slab. For example, the uncut slab is taken up as-is by the coiler 24.

In the following description of the configuration and the operations, the cutting position control device determines whether or not to cause the downstream cutter 83 to further cut the slab 2 that is cut by the upstream cutter 81, and sets the cutting position of the slab when cut by the downstream cutter 83, which are described in detail. In the example, the intermediate cutter 82 is not directly related to the determination of the cutting position and/or the correction operation of the cutting position for the upstream cutter 81 and the downstream cutter 83 because the intermediate cutter 82 is used for the crop cutting of the front end and the tail end. A detailed description of the intermediate cutter 82 is therefore omitted. In such a case, the cutting control of the intermediate cutter 82 is easily realized by using well-known feed distance measurement technology of the field of rolling systems.

Multiple sensors are provided in the rolling system 20 to detect the positions and feed distances of the slabs 1 to 3 that are fed. In the example, the multiple sensors are HMDs 84, 85, 87, and 89 and PLGs 86, 88, and 90. The HMDs 84, 85, 87, and 89 are detectors (Hot Metal Detectors, HMDs) that detect heat rays. A camera for detecting visible light and/or infrared, etc., may be utilized instead of a heat ray detection-type detector.

The PLGs 86, 88, and 90 are detectors that measure movement distances. The PLGs 86, 88, and 90 are, for example, pulse generator-type counters, etc. The PLGs 86 and 90 are located at table rolls, etc., and output pulses according to the rotational speeds of the table rolls; and the movement distance of the slab fed over the table rolls is calculated by counting the output pulses. The PLG 87 is located at a rolling mill roll of the mill of the final stage of the finishing rolling mill 23. The movement distance of the rolled slab is calculated by the PLG 87 while the rolling mill roll of the final stage mill discharges the rolled slab 3. Methods other than a pulse generator-type counter may be utilized as long as the movement distance of the slab can be measured.

The HMD 84 detects heat rays of the slab 1 dispatched from the continuous casting equipment 21. The HMD 84 is located frontward of the upstream cutter 81 at the dispatch side of the continuous casting equipment 21. The HMD 84 detects the position of the front end of the slab 1 cast by the continuous casting equipment 21. The HMD 84 generates and outputs a signal TP1. The HMD 84 transitions the output signal TP1 to active when the HMD 84 detects the front end of the slab 1. For example, setting the signal to active refers to the HMD 84 outputting the signal TP1="0" before detecting the front end of the slab 1 and transitioning the signal TP1 to "1" when the slab 1 is detected. The timing of transitioning the signal from "0" to "1" is the timing of detecting the front end of the slab 1. Instead of the description recited above, the timing of transitioning the signal from "1" to "0" may be the timing of detecting the front end of the slab 1; in such a case, the logic of the active signal is "0".

The HMD 85 detects the heat rays of the slab 2 cut by the upstream cutter 81. The HMD 85 is located between the upstream cutter 81 and the rough rolling mill 22. The HMD 85 outputs the signal TP2. When the HMD 85 detects the front end of the slab 2, the HMD 85 transitions the signal TP2 to active; when the HMD 85 detects the passage of the tail end of the slab 2, the HMD 85 transitions the signal TP2 to inactive.

The PLG 86 is a pulse generator-type counter that measures the movement distance of the slab 2 cut by the upstream cutter 81. The PLG 86 is located between the upstream cutter 81 and the rough rolling mill 22. In the example, the PLG 86 is located at one of the table rolls located along the pass line. The table roll at which the PLG 86 is located is located between the upstream cutter 81 and the rough rolling mill 22. The PLG 86 outputs the pulse signal PC2 according to the rotational speed of the table roll. The pulse signal PC2 that is output is transmitted to a process control device, summed, and counted; and the feed distance of the slab 2 is calculated. The feed distance of the slab 2 measured by the PLG 86 is used to determine the length of the slab 2. Although the determination of the length of the slab 2 is elaborated below, the cutting position control device determines whether or not the cutting position of the slab 2 is according to the initial setting.

The HMD 87 is located between the finishing rolling mill 23 and the downstream cutter 83. In the example, the runout table 28 is located between the finishing rolling mill 23 and the downstream cutter 83; therefore, the HMD 87 is located between the finishing rolling mill 23 and the runout table 28. The HMD 87 detects the front end and the tail end of the slab 3 rolled by the finishing rolling mill 23 by detecting the heat rays of the slab 3. When the HMD 87 detects the front end of the slab 3, the HMD 87 transitions the signal TP3 to active; and when the HMD 87 detects the passage of the tail end of the slab, the HMD 87 transitions the signal TP3 to inactive.

The PLG 88 measures the movement distance of the slab 3 rolled by the finishing rolling mill 23. In the example, the PLG 88 is located at a rolling mill roll of the final stage mill of the finishing rolling mill 23. The PLG 88 may be located at a table roll at the dispatch side of the finishing rolling mill 23. The PLG 88 outputs the pulse signal PC3 according to the rotation of the rolling mill roll. The pulse signal PC3 is transmitted to the process control device, summed, and counted; and the feed distance of the slab 3 is calculated.

The HMD 89 and the PLG 90 are located between the downstream cutter 83 and the coiler 24. The HMD 89 detects the front end and the tail end of the slab 3 passing through the downstream cutter 83. The HMD 89 outputs the active signal TP4 while the slab 3 is detected.

The PLG 90 generates the pulse signal PC4 according to the rotational speed of the table roll at which the PLG 90 is located. The signal TP4 and the pulse signal PC4 are transmitted to the process control device; and the length of the slab 3 passing through the downstream cutter 83 is measured.

Thus, the signals TP1 to TP4 that are output from the HMDs 84, 85, 87, and 89 and the pulse signals PC2 to PC4 that are output from the PLGs 86, 88, and 90 are processed according to a program set in the process control device.

The selection of the arrangement and/or types of the sensors, etc., is not limited to that described above. It is sufficient for the selection of the arrangement and/or types of the sensors, etc., to be such that the length of the slab 2 cut by the upstream cutter 81 can be measured at some rolling process and that the position cut by the downstream cutter 83 can be measured at some rolling process.

The configuration of the cutting position control device will now be described.

Figure 2:
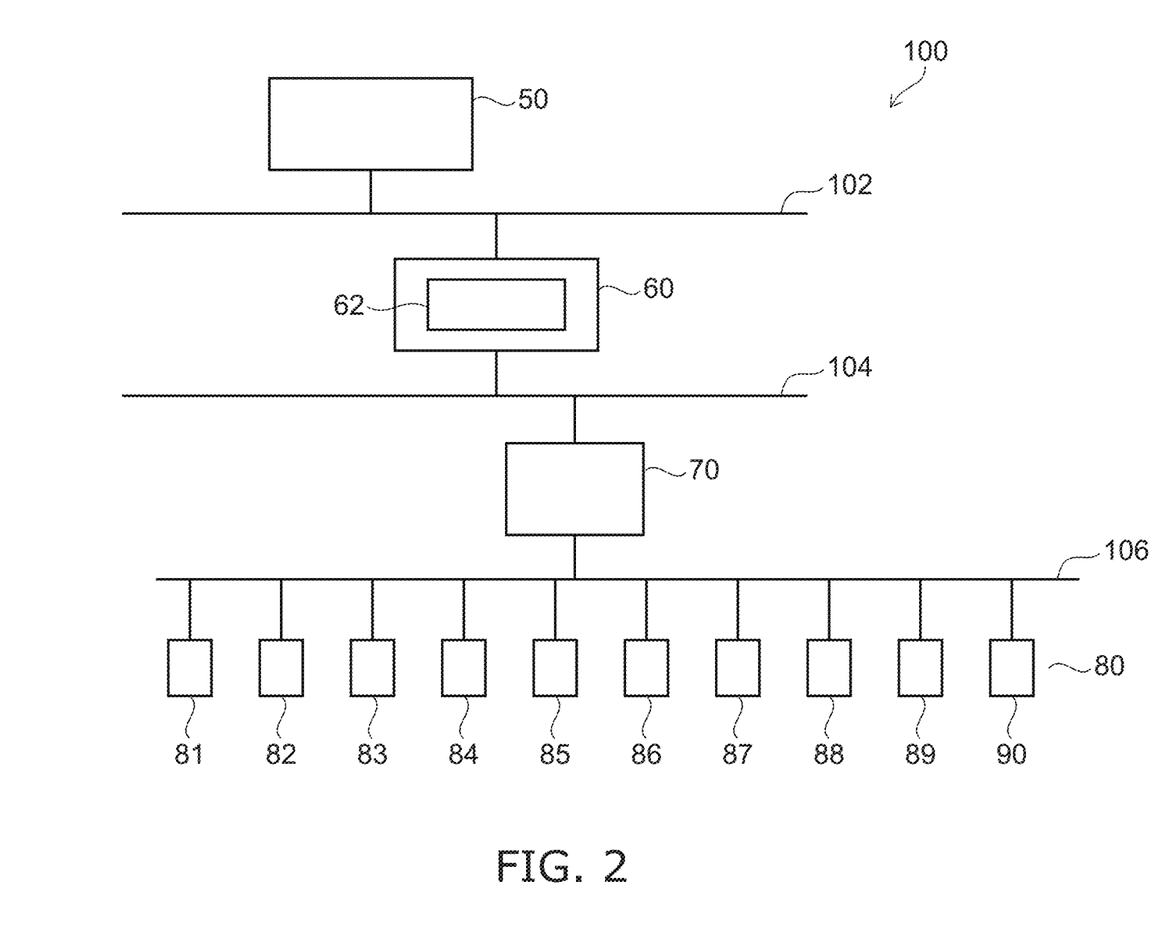
FIG. 2 is a block diagram illustrating a cutting position control device of an embodiment.

FIG. 2 is a block diagram illustrating a cutting position control device of an embodiment.

A control system 100 for controlling the rolling system 20 is shown in FIG. 2 together with the configuration of the cutting position control device 60.

As shown in FIG. 2, the control system 100 includes a higher-level system 50, the cutting position control device 60, and a process control device 70. The cutting position control device 60 is connected to the higher-level system 50 via a communication network 102. The communication network 102 is a general-purpose communication network and is, for example, Ethernet (registered trademark), etc.

The higher-level system 50 stores and manages databases for production management, quality control, etc. The database for production management stores production schedules for each product, material information for each product, etc. The database for quality control stores the data of the dimensions, the data of the weight, and the like for each product that is manufactured. The higher-level system 50 extracts the desired data from the database for production management via the communication network 102 and transmits the desired data to the cutting position control device 60.

The higher-level system 50 is, for example, a large-capacity high-speed information processing device such as a data server, etc. The higher-level system 50 is not limited to a single data server and may be multiple data servers. For example, the database for production management, the operational software of the database for production management, etc., may be loaded into one data server; and the database for quality control, the operational software of the database for quality control, etc., may be loaded into one other data server.

The cutting position control device 60 is connected to the process control device 70 via the communication network 104. The communication network 104 is, for example, the communication network of a control system such as FL-net, etc. The cutting position control device 60 generates programs for the process control device 70 and parameters set in the programs according to the data of the production schedule and the data of the material information received from the higher-level system 50 via the communication network 104. The programs and the parameters for the process control device 70 include data of the lengths of the products to be produced. The specifications that include the material data and/or the timing of the products to be produced are provided by the data of the production schedule and the material information.

The cutting position control device 60 generates a parameter (a first parameter) relating to the cutting position of the slab 1 so that the process control device 70 generates a cut command at the timing of the cutting of the slab 1 by the upstream cutter 81. The cutting position control device 60 generates a parameter (a second parameter) relating to the cutting position of the slab 2 so that the process control device 70 generates a cut command at the timing of further cutting of the slab 2 by the downstream cutter 83.

When generating a parameter relating to the cutting position of the downstream cutter 83, the cutting position control device 60 determines whether or not the cutting position of the slab 1 by the upstream cutter 81 is as set. The cutting position control device 60 uses the measured value of the length of the slab 2 obtained by cutting the slab 1 to determine the cutting position of the slab 1. The cutting position control device 60 generates the parameter relating to the cutting position of the downstream cutter 83 based on the measured value of the length of the slab 2. The cutting position control device 60 also generates a parameter relating to the cutting position of the intermediate cutter 82.

The cutting position control device 60 includes an arithmetic processing circuit 62. The arithmetic processing circuit 62 is, for example, a logical arithmetic processing circuit and includes a CPU (Central Processing Unit). The cutting position control device 60 is, for example, an information processing device such as a computer device in which high-speed arithmetic processing is possible, etc. The cutting position control device 60 is a computer device that includes a CPU that operates according to a program including the steps of a flowchart described below. In the description of the flowchart described below, the steps of the flowchart are executed by the operation of the arithmetic processing circuit 62 when the execution subject is the cutting position control device 60.

For example, the cutting position control device 60 is realized as one function inside a computer system in which other programs relating to the rolling control, the cooling water control, etc., operate. The computer system that includes the cutting position control device 60 is not limited to a single information processing device and may include multiple information processing devices. For example, one information processing device may be used as the cutting position control device 60 by loading a program for the cutting position control device 60; and a program that relates to the rolling control may be loaded in one other information processing device.

The programs and the parameters that are generated by the cutting position control device 60 are received and set by the process control device 70 from the cutting position control device 60 via the communication network 104. Based on the programs and the parameters that are set, the process control device 70 generates a cut command at the timing at which the feed distance of the slab 1 reaches the cutting position of the upstream cutter 81, and transmits the cut command to the upstream cutter 81.

The process control device 70 also sets a parameter of setting the cutting position of the downstream cutter 83 when correcting the cutting position cut by the upstream cutter 81.

The process control device 70 is connected to input/output devices 80 of various sensors, actuators, etc., via the communication network 106. The input/output devices 80 include the upstream cutter 81, the intermediate cutter 82, and the downstream cutter 83. The input/output devices 80 include the HMDs 84, 85, 87, and 89 and the PLGs 86, 88, and 90. The process control device 70 sets the cutting positions of the slabs 1 and 2 according to the control program set by the cutting position control device 60, the set parameters, and the outputs of the HMDs 84, 85, and 87 and the PLGs 86 and 88; and the process control device 70 transmits the cut commands at the set timing to the upstream cutter 81, the intermediate cutter 82, and the downstream cutter 83.

The process control device 70 measures the length of the slab 3 passing through the downstream cutter 83 according to the control program set by the cutting position control device 60, the set parameters, and the outputs of the HMD 89 and the PLG 90; and the process control device 70 transmits the measured data to the cutting position control device 60.

The process control device 70 is, for example, a CPU of a programmable logic controller (PLC), an I/O module, etc. To realize the operations described below or to control the entire rolling system 20, the process control device 70 is not limited to a single PLC and may include multiple PLCs.

The higher-level system 50 is not always essential in the control system 100. The data of the production schedule, etc., may be input to the cutting position control device 60 directly by hand, etc.; and the coil data that is generated may be managed in the cutting position control device 60.

Operations of the cutting position control device 60 of the embodiment will now be described with reference to a flowchart.

Figure 3:
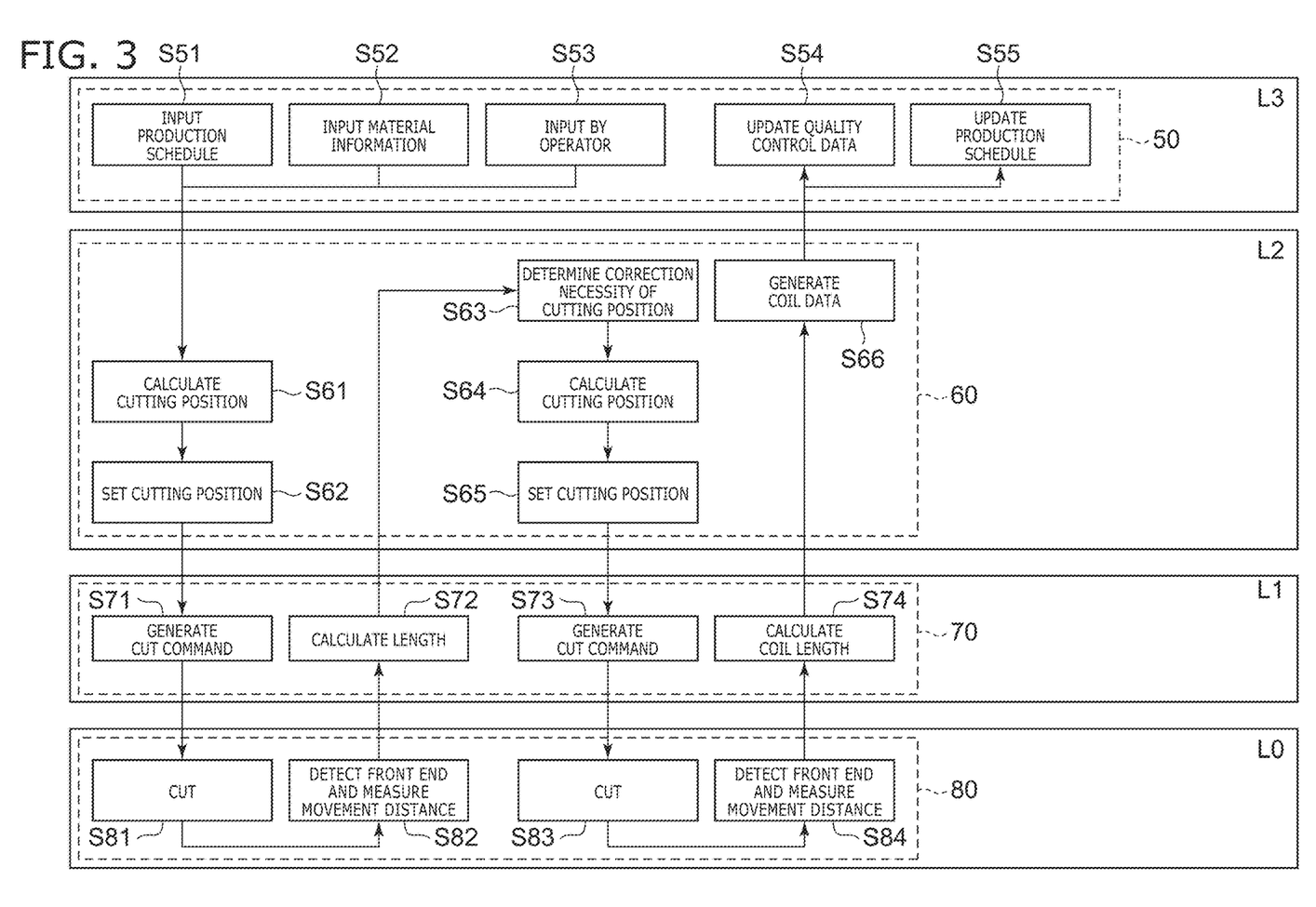
FIG. 3 is an example of a flowchart for describing operations of the cutting position control device of the embodiment.

FIG. 3 is an example of a flowchart describing the operations of the cutting position control device of the embodiment.

A flowchart in which the entire control system 100 is executed is shown in FIG. 3. The control system 100 includes multiple hierarchical levels. A level L3 of the highest rank is a level that includes the higher-level system 50. The level L3 may include multiple higher-level systems. The multiple higher-level systems are, for example, when systems for multiple rolling plants are included, etc. A second level L2 is the level of the computer system. The level L2 of the calculation system is a level that includes the cutting position control device 60. Also, although not illustrated, the level L2 may include a control device that generates control programs and the like that relate to rolling control, water cooling control, etc. A first level L1 is a level that includes the process control device 70. A level L0 of the lowermost layer includes sensors and/or actuators located in the actual rolling system 20.

In the operation description using the flowchart of FIG. 3, it is taken that the control program for controlling the upstream cutter 81, the intermediate cutter 82, and the downstream cutter 83 is preset in the process control device 70. The cutting positions of the slabs are set by setting the parameters generated by the cutting position control device 60 in the control program. For example, the control program that is set in the process control device 70 is transmitted from the cutting position control device 60. For example, the cutting position control device 60 generates the control program of the cutters based on the data of the production schedule database and the data of the material information database, and transmits the generated control program to the process control device 70. As described above, a description of the operation of the intermediate cutter 82 is omitted.

In steps S51 and S52 as shown in FIG. 3, the higher-level system 50 transmits to the cutting position control device 60 data of the specifications of the product to be produced, the timing of the production, etc., from the production schedule database and the material information database.

In step S53 in the example, the higher-level system 50 may transmit data that is input by an operator instead of the data of the production schedule database or in addition to the data of the production schedule database.

In step S61, the cutting position control device 60 calculates the cutting position of the slab 1 by the upstream cutter 81 based on the data of the production schedule database and the data of the material information database transmitted from the higher-level system 50.

In step S62, the cutting position control device 60 sets the calculated cutting position as the cutting position of the slab 1 by the upstream cutter 81, generates the corresponding parameter (the first parameter), and transmits the generated parameter to the process control device 70.

In step S71, the process control device 70 sets the parameter relating to the cutting position of the slab 1 generated by the cutting position control device 60 in the control program.

The process control device 70 receives the active signal TP1 from the HMD 84 and determines whether or not the front end of the slab 1 output from the continuous casting equipment 21 has passed through the HMD 84. The feed speed of the slab 1 output from the continuous casting equipment 21 is controlled to be a constant value. For example, the feed speed of the slab 1 is set as a parameter that has a constant value in the program set in the process control device 70.

The process control device 70 starts a timer at the timing of detecting the front end position of the slab 1. The process control device 70 calculates the feed distance of the slab 1 by using the time output by the timer and the data of the feed speed of the slab. The process control device 70 uses the calculated feed distance to determine whether or not the slab 1 has reached the cutting position of the upstream cutter 81. The process control device 70 transmits the cut command to the upstream cutter 81 when the slab 1 reaches the cutting position of the upstream cutter 81.

In step S81, the upstream cutter 81 receives the cut command from the process control device 70. Based on the cut command, the upstream cutter 81 drives an actuator to cut the slab 1 at the position set by the parameter transmitted from the cutting position control device 60.

In step S82, the HMD 85 transitions the signal TP2 to active when the HMD 85 detects the front end of the slab 2 cut by the upstream cutter 81. The process control device 70 initializes the PLG 86 at the timing at which the active signal TP2 is received from the HMD 85. The PLG 86 generates the pulse signal PC2 according to the rotational speed of the table roll feeding the slab 2 and transmits the pulse signal PC2 to the process control device 70.

The HMD 85 transitions the signal TP2 to inactive when the HMD 85 detects the tail end of the slab 2.

In step S72, the process control device 70 sums the pulse signal PC2 received from the PLG 86 in the period in which the HMD 85 is active and calculates the feed distance of the slab 2. The feed distance of the slab 2 is the length from the front end to the tail end of the slab 2 and therefore is the length of the slab 2. The process control device 70 transmits the data of the calculated length of the slab 2 to the cutting position control device 60.

In step S63, the cutting position control device 60 compares the data of the calculated length of the slab 2 and the data of the length of the slab set based on the production schedule. Based on the comparison result of the data of these lengths, the cutting position control device 60 determines whether or not to correct the cutting position of the downstream cutter 83. Details of the determination of the correction necessity of the cutting position and the cutting position determination method when correcting the cutting position are described below.

In step S64, the cutting position control device 60 calculates the cutting position of the downstream cutter 83 when it is determined in step S63 that a correction of the cutting position of the slab 2 is necessary.

In step S65, the cutting position control device 60 generates a parameter (the second parameter) relating to the calculated cutting position. The cutting position control device 60 transmits the generated parameter to the process control device 70.

In step S73, the process control device 70 sets the parameter of the cutting position to be set by the cutting position control device 60 in the control program.

The process control device 70 detects whether or not the front end of the slab 3 output from the finishing rolling mill 23 has passed through by receiving the signal TP3 from the HMD 87. The process control device 70 detects that the tail end of the slab has passed through the HMD 87 by the signal TP3 transitioning to inactive.

When the process control device 70 detects the front end of the slab 3, the process control device 70 initializes the PLG 88 and starts the sum of the pulse signal PC3. The process control device 70 continues the sum of the pulse signal PC3 until the signal TP3 from the HMD 87 becomes inactive. The process control device 70 calculates the feed distance of the slab 3 based on the summation result of the pulse signal PC3. The feed distance of the slab 3 is the length of the slab 3. When the feed distance of the slab 3 becomes the length corresponding to the set parameter, the process control device 70 generates a cut command for the downstream cutter 83 and transmits the generated cut command to the downstream cutter 83.

In step S83, the downstream cutter 83 receives the cut command from the process control device 70 and cuts the slab 3 according to the received cut command.

In step S84, the HMD 89 detects the front end of the slab 3 passing through the downstream cutter 83 and outputs the active signal TP4. The PLG 90 outputs the pulse signal PC4 according to the feeding of the slab 3. The HMD 89 transitions the signal TP4 to inactive when the tail end of the slab 3 passes through. The signal TP4 and the pulse signal PC4 are transmitted to the process control device 70.

In step S74, the process control device 70 calculates the feed distance of the slab 3 passing through the downstream cutter 83 based on the summation result of the pulse signal PC4 in the period in which the signal TP4 is active. The feed distance of the slab 3 is the length of a product 5 taken up by the coiler 24. The process control device 70 collects data other than the length of the product 5 that is collected by other sensors of the level L0, etc., and transmits the collected data to the cutting position control device 60.

In step S66, the cutting position control device 60 associates the data received from the process control device 70 with coil data. For example, an identification number that identifies the product is assigned for the coil data in the production schedule database; and the coil data is associated with the identification number. Other than the length of the product 5 taken up by the coiler 24, the coil data may include data such as the weight of the product 5, etc. The coil data also can be associated with data acquired by other control devices, etc. For example, data of the surface state of the product, etc., may be associated with the coil data. The cutting position control device 60 transmits the generated coil data to the higher-level system 50.

In step S54, the higher-level system 50 stores the received coil data in the quality control database and updates the quality control database.

In step S55, the higher-level system 50 uses the received coil data to update the production schedule database. The update of the production schedule database can include, for example, the following processing.

When the generated coil data matches the specifications of the product set in the production schedule, a flag indicating that the processing has finished is set in the data of the production schedule database.

When the data of the length of the product in the coil data does not match the specifications of the product set in the production schedule, for example, the higher-level system 50 searches in the production schedule database for another product that matches. When the production schedule of such a product is in the production schedule database, the higher-level system 50 sets a flag indicating that the processing has finished in the data of that production schedule.

When there is no such product production schedule in the production schedule database, the higher-level system 50 assumes the possibility of newly setting a production schedule and sets a flag indicating that the processing is on hold. When the product for which the processing is on hold can be shipped by combining with another coil, processing such as associating the product serial number of the coil to be combined and the serial number of the product for which the processing is on hold, etc., are performed.

Thus, the cutting position control device 60 of the embodiment determines whether or not the cutting position of the slab cut by the upstream cutter 81 is the desired position. Even when the cutting position of the slab is not the desired position, the cutting position control device 60 can use the downstream cutter 83 to perform further cutting, or can control the slab to be a slab with a possibility of utilization without cutting. The slab that has the possibility of utilization can be utilized to reschedule the production schedule in the higher-level system 50 of the level L3.

The method of determining the necessity of the correction of the cutting position of step S63 of FIG. 3 will now be described in more detail.

FIGS. 4(a) and 4(b) are schematic views for describing cutting positions of the slab.

FIGS. 4(a) and 4(b) show the cutting position of the slab 1 dispatched from the continuous casting equipment 21. The arrows of the drawings illustrate the feed direction of the slab 1.

FIG. 4(a) shows an example when the upstream cutter 81 cuts the slab 1 at a cutting position C0. The cutting position C0 matches the position set by the data of the initial production schedule database. The slab 1 is subdivided into a preceding material 2a and a succeeding material 2b at the cutting position C0.

FIG. 4(b) shows an example when the upstream cutter 81 cuts the slab 1 at a cutting position Cl. The cutting position Cl is shifted from the cutting position set by the data of the initial production schedule database. The slab 1 is subdivided into a preceding material 2a1 and a succeeding material 2b2 at the cutting position Cl.

The cutting position that is initially set is the cutting position that is calculated and set in steps S61 and S62 of FIG. 3.

As shown in FIG. 4(a), the slab 1 is cast by the continuous casting equipment 21, is cut by the upstream cutter 81, and is subdivided into a slab 2a and a slab 2b. The slab 2a is the preceding material. The slab 2b is the succeeding material that succeeds the slab 2a. The cutting position C0 of the upstream cutter 81 is the position of a length L from the front end of the slab 2a. Here, the length L of the slab 2a is equal to a length L0 calculated by the cutting position control device 60 based on the data of the production schedule database. Accordingly, the cutting position control device 60 determines the cutting position of the preceding material 2*a* to be the cutting position C0 that is initially set.

Figure 4:
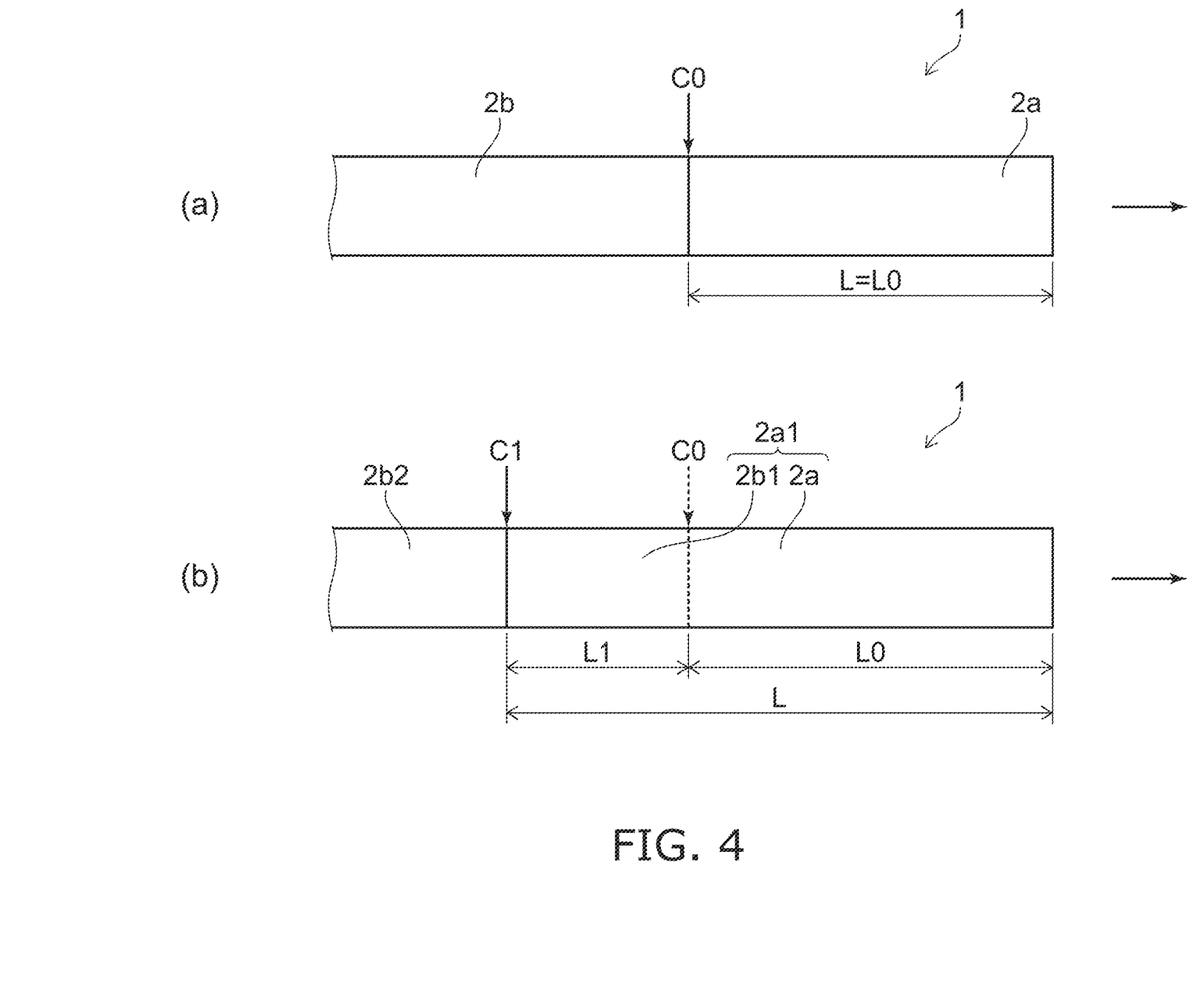
FIGS. 4(a) and 4(b) are schematic views for describing cutting positions of the slab.

As shown in FIG. 4(*b*), the upstream cutter 81 has cut the slab 1 at the cutting position C1 that is different from the cutting position C0 of FIG. 4(*a*). The cutting position C1 is the position of the length L=L0+L1 from the front end of the slab 1. The slab 1 is subdivided into the preceding material 2*a*1 and the succeeding material 2*b*2. Accordingly, the length of the preceding material 2*a*1 is L=L0+L1. The cutting position control device 60 determines that the cutting position C1 of the preceding material 2*a*1 is shifted from the cutting position C0 that is initially set.

The cutting position control device 60 compares the length L0 that is set and the length L that is actually measured. When the length L is determined to be greater than the length L0, the cutting position control device 60 further determines whether or not the length L1 that is the length L0 subtracted from the length L is a sufficient length to form a coil by taking up the slab. When the length L1 is determined to be a sufficient length to take-up using the coiler 24, the cutting position control device 60 generates a parameter for the control program so that the downstream cutter 83 cuts at the cutting position C0.

The preceding material 2*a*1 is further subdivided into the slab 2*a* and the slab 2*b*1 by being cut by the downstream cutter 83. The slab 2*a* and the slab 2*b*1 each are taken up by the coiler 24. The slabs 2*a* and 2*b*1 that are taken up are two coils.

When the length L1 is determined not to be a sufficient length to be taken up by the coiler 24, the cutting position control device 60 determines whether to take-up the preceding material 2*a*1 as-is without cutting at the cutting position C0 or whether to cut at a cutting position that is different from the cutting position C0. The cutting position that is different from the cutting position C0 is, for example, a position such that the length of each of the slabs after subdividing is (½)×L.

The series of operations described above will now be described in more detail with reference to a flowchart.

Figure 5:
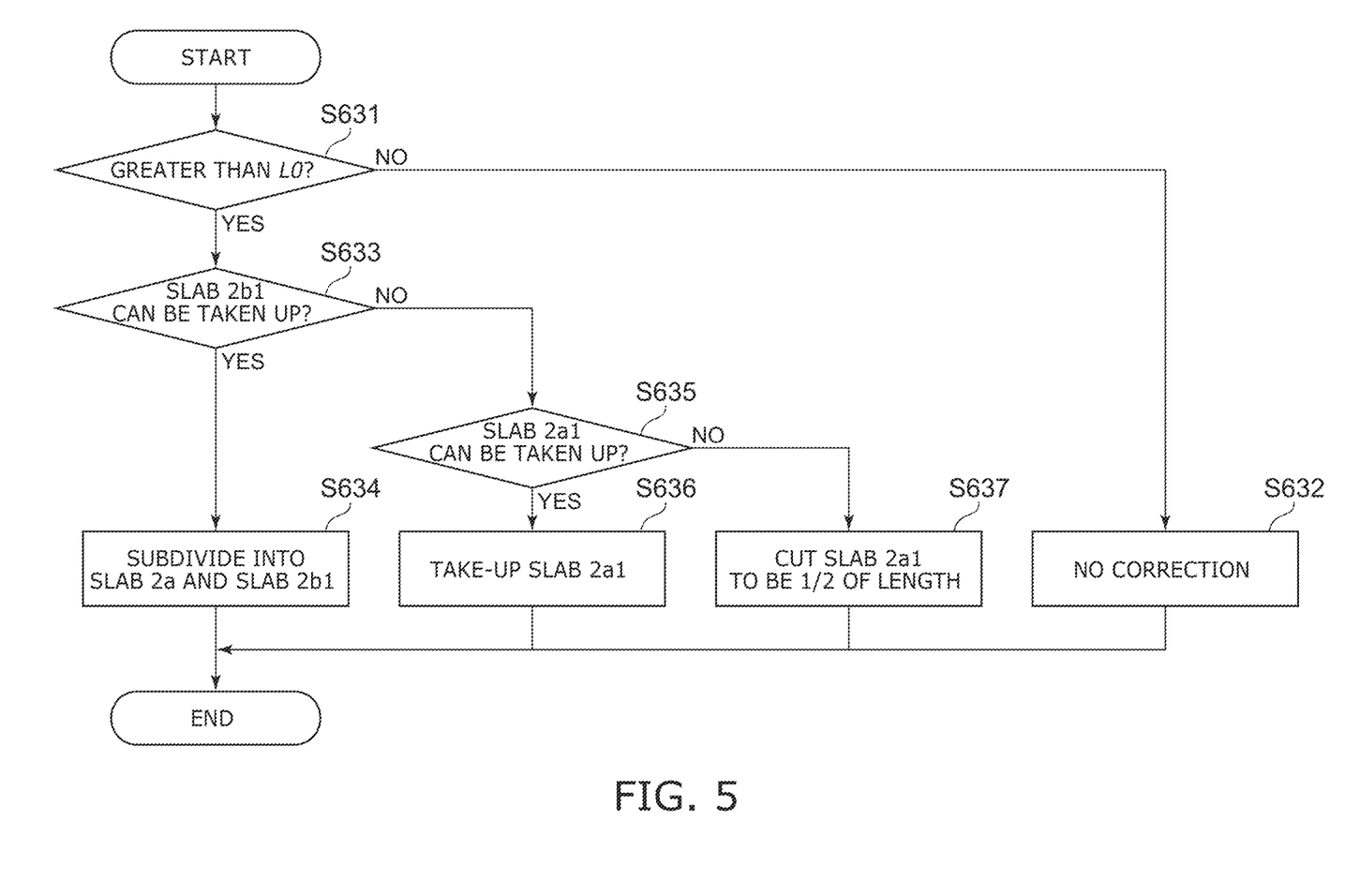
FIG. 5 is an example of a flowchart describing the operations of the cutting position control device of the embodiment.

FIG. 5 is an example of a flowchart for describing the operations of the cutting position control device of the embodiment.

In step S631 as shown in FIG. 5, the cutting position control device 60 compares the length L of the preceding material 2*a* measured by the HMD 85 and the PLG 86 to the length L0 that is set. When the length L is equal to the length L0, the cutting position control device 60 determines that the cutting position of the upstream cutter 81 is the cutting position that is initially set and transitions the processing to step S632.

In step S632, the cutting position control device 60 ends the processing of the program for the preceding material 2*a* without generating a cut command of the downstream cutter 83.

Even when the length L of the preceding material 2*a* is determined to be less than the set length L0 in step S631, the cutting position control device 60 transitions the processing to step S632 and ends the processing of the program. In such a case, the product is different from the data of the initial production schedule database. Therefore, in the higher-level system 50, for example, another product serial number is assigned, is associated with the coil data, and is stored in the database; and the final processing is set to an on-hold state, etc. For example, when there is a production schedule of a product that has the same coil data as the product that is in the on-hold state, the product that is in the on-hold state is substituted for data in the production schedule database and is used to reschedule the production schedule.

When the length L is determined by the cutting position control device 60 to be greater than the length L0 in step S631, the cutting position control device 60 transitions the processing to step S633.

In step S633, the cutting position control device 60 determines whether or not the slab 2*b*1 has a sufficient length to be taken up. The length of the slab 2*b*1 is L1 and is calculated by subtracting the length L0 that is initially set from the length L of the preceding material 2*a*1. The sufficient length to be taken up by the coiler 24 is preset.

When the length L1 is determined to be a sufficient length to be taken up by the coiler 24, the cutting position control device 60 transitions the processing to step S634.

In step S634, the cutting position control device 60 generates the parameter that sets the cutting position for the slab 2*a*1 and transmits the generated parameter to the process control device 70. The process control device 70 sets the received parameter in the control program and generates the cut command for the downstream cutter 83. In such a case, the cutting position is the cutting position C0 of FIG. 4(*b*).

When the length L1 is determined in step S633 to be a length that is insufficient to be taken up, the cutting position control device 60 transitions the processing to step S635.

In step S635, the cutting position control device 60 determines whether or not the preceding material 2*a*1 of the length L can be taken up. The preceding material 2*a*1 being able to be taken up means that the weight of the coil of the preceding material 2*a*1 formed by the coiler 24 is not more than a value that can be transferred. Therefore, in this and subsequent steps, the cutting position control device 60 determines whether or not a coil of an appropriate weight can be formed based on the weight of the slab. The weight of the slab is calculated based on the length, the width, the thickness, and the material of the slab.

When the preceding material 2*a*1 is determined in step S635 to have a weight that can form a coil, the cutting position control device 60 transitions the processing to step S636.

In step S636, the cutting position control device 60 does not generate a parameter for setting the cutting position of the downstream cutter 83. The preceding material 2*a*1 that is input to the finishing rolling mill 23 is finishing-rolled, passes through the runout table 28, and is taken up by the coiler 24 without being cut by the downstream cutter 83.

When the slab 2*a*1 is determined in step S635 not to have a weight that can form a coil, the cutting position control device 60 transitions the processing to step S637.

In step S637, the cutting position control device 60 generates a parameter that sets the cutting position of the downstream cutter 83. The generated parameter is transmitted to the process control device 70; and the process control device 70 sets the parameter in the control program. The process control device 70 transmits the cut command to the downstream cutter 83 at a timing based on the set parameter. The cutting position of the downstream cutter 83 at this time is, for example, a position that is ½ of the length L of the preceding material 2*a*1.

Although the cutting position of the downstream cutter 83 is set to ½ of the slab 2*a*1 in step S637, it is sufficient for the position used as the cutting position to be such that the slabs that are cut have lengths that can be taken up by the coiler 24 without exceeding the weight limit.

Thus, even when the cutting position of the slab cut by the upstream cutter 81 has shifted from the position set based on the length of the slab that is initially calculated, the generation of scrap can be suppressed by using the downstream cutter 83.

Effects of the cutting position control device 60 of the embodiment will now be described while comparing with a comparative example.

Figure 6:
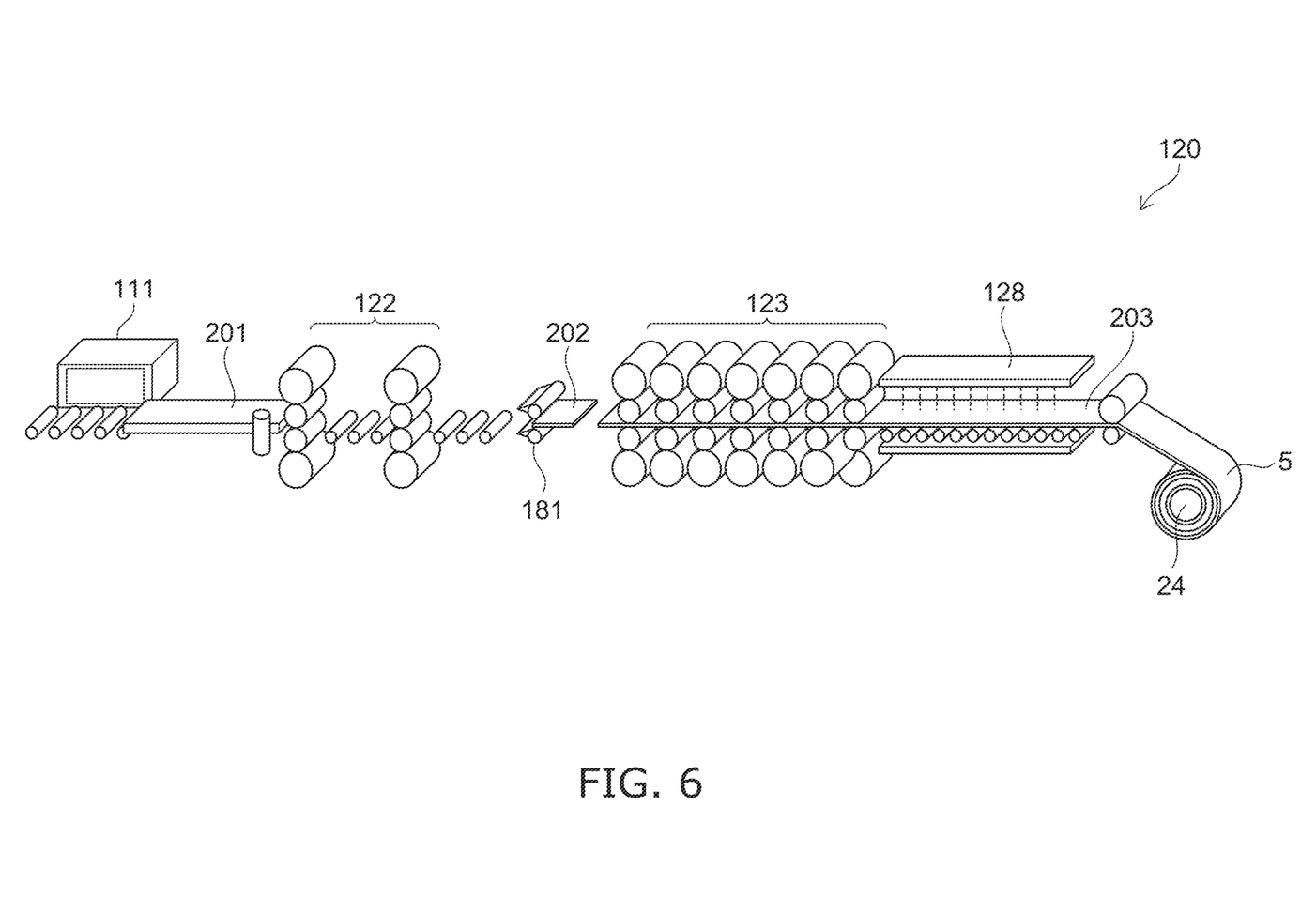
FIG. 6 is a schematic view illustrating a rolling system of a comparative example.

FIG. 6 is a schematic view illustrating a rolling system of a comparative example.

An example of a batch rolling-type rolling system 120 is shown in FIG. 6.

As shown in FIG. 6, the rolling system 120 includes a heating furnace 111, a rough rolling mill 122, a finishing rolling mill 123, and a runout table 128. A slab that is separately formed by continuous casting equipment, etc., is transferred into the heating furnace 111 and heated to a prescribed temperature.

The slab 201 that is transferred into the heating furnace 111 and is input to the pass line from the heating furnace 111 is set to have a length corresponding to the length of a product to be taken up by the coiler 24.

For example, a cutter 181 is located at the dispatch side of the rough rolling mill 122; and crop cutting of the front end and the tail end of the slab 202 rolled by the rough rolling mill 122 is performed. The slab 203 after the crop cutting is transferred into the finishing rolling mill 123, is finishing-rolled, is cooled at the runout table 128, and is subsequently taken up by the coiler 24.

In such a batch rolling technique, the input of the slab is offline with respect to the rolling line; therefore, not only is it necessary to perform the transfer of the slab, but due to the wait to input the slab into the rolling line, it is also necessary to reheat by using the heating furnace 111. Therefore, it is difficult to further increase the production efficiency; the energy consumption of the heating furnace 111 is necessary; and there are cases where higher energy conservation is obstructed.

Therefore, recent years have seen approaches that increase the productivity by connecting the continuous casting equipment to the rolling equipment. In a batch rolling technique, problems may occur in which the yield of the product of a necessary length is reduced due to the crop cutting. Therefore, in a continuous casting equipment-connected rolling system, an endless rolling technique is common in which the slab is not cut until take-up.

On the other hand, according to the specifications of steel materials to be produced, production using the endless rolling technique is difficult, and there are cases where it is necessary to produce using the batch rolling technique.

The cutting position control device 60 of the embodiment can set the cutting position of the upstream cutter 81 and can set the cutting position of the downstream cutter 83 according to the cutting position of the upstream cutter 81 in a continuous casting equipment-connected rolling system. More specifically, when a shift occurs in the cutting position of the slab 2 cut by the upstream cutter 81 and the length of the slab 2 exceeds the desired length, the cutting position control device 60 can determine whether or not further cutting by the downstream cutter 83 is to be performed. Thereby, the cutting position control device 60 can further cut a long slab having a shifted cutting position so that the slab also is utilized as a product.

Although operations in the process control device 70 control the length, the thickness, and the like of the slab by using values measured by sensors in the rolling line, it is difficult to avoid fluctuation occurring in the quality of the product due to the accuracy of the model used in the control program, etc. Also, change over time such as the wear degree of the mill of the rolling mill, etc., also may occur; therefore, it is difficult to manufacture the product as calculated by the model.

The cutting position control device 60 of the embodiment can directly measure the length of the slab cut by the upstream cutter 81 until the slab reaches the downstream cutter 83; therefore, the length can be corrected to be the appropriate length by the downstream cutter 83.

Also, even when some failure occurs in the rolling line after the cutting by the upstream cutter 81, the slab can be corrected to have the appropriate length by directly measuring the length of the slab cut by the upstream cutter 81.

Thus, even when a shift occurs in the cutting position of the upstream cutter 81, the yield of the product can be increased because the shift of the cutting position caused by the downstream cutter 83 can be corrected.

The cutting position control device 60 of the embodiment can generate the coil data by measuring the length, the weight, and the like of the slab 3 passing through the finishing rolling mill 23. The cutting position control device 60 transmits the generated coil data to the higher-level system 50; and rescheduling of the production schedule can be performed in the higher-level system 50 based on the received coil data. By rescheduling the production schedule, even if a product that is out-of-specification in the initial production schedule is produced, the product that is produced can be substituted for another product, or the product that is out-of-specification can be utilized by combining the product that is produced with another product, which can contribute to an increase of the yield.

The parameters of the control program that control the cutters can be easily generated, modified, etc. The parameter of the control program can be easily transmitted to the downstream cutter 83 at the appropriate timing without being transmitted to the upstream cutter 81 and the intermediate cutter 82. By performing such a correction, the rolling system of the batch rolling technique described above can be easily switched to an endless rolling-type rolling system.

A case is described above where the slab 2 that is cut by the upstream cutter 81 is cut by the downstream cutter 83 to correct the cutting position. The upstream cutter 81 is located at a position to cut the slab 1 dispatched from the continuous casting equipment 21; and the downstream cutter 83 is located at a position to cut the slab 3 dispatched from the finishing rolling mill 23. It is sufficient for the downstream cutter 83 to be located further downstream in the rolling line than the upstream cutter 81; for example, the cutting position of the upstream cutter 81 may be corrected by the intermediate cutter 82. In such a case, the crop cutting may be performed by a cutter located at the dispatch side of the finishing rolling mill, or the crop cutting may be performed by the intermediate cutter 82 without providing a cutter at the dispatch side of the finishing rolling mill.

Thus, a cutting position control device is realized and makes possible a continuous casting equipment-connected rolling system in which the yield of the product is improved.

While certain embodiments have been described, these embodiments have been presented by way of example only, and are not intended to limit the scope of the inventions. The novel embodiments described herein may be embodied in a variety of other forms; furthermore, various omissions, substitutions, and changes in the form of the embodiments described herein may be made without departing from the spirit of the inventions. Such embodiments and their modifications also are within the scope and spirit of the inventions, and are within the scope of the inventions described in the claims and their equivalents.

REFERENCE NUMERAL LIST 1, 2, 3 slab
20 rolling system
21 continuous casting equipment
22 rough rolling mill
23 finishing rolling mill
24 coiler
28 runout table
50 higher-level system
60 cutting position control device
62 arithmetic processing circuit
70 process control device
80 input/output device
81 upstream cutter
82 intermediate cutter
83 downstream cutter
84, 85, 87, 89 HMD
86, 88, 90 PLG
100 control system

The invention claimed is:

1. A cutting position control device, comprising:
a first sensor configured to detect a length of a first slab cast by continuous casting equipment;
a second sensor configured to detect a length of a second slab, the second slab being cut from the first slab by a first cutter; and
an arithmetic processing circuit configured to
receive an input of first data including information relating to
a production schedule, and
material information of a material to be produced,
use the first data to calculate a first cutting position of the first cutter for the first slab,
generate a first parameter for setting the first cutting position for a control program introduced to a process control device, and
determine whether or not to use a second cutter to further cut the second slab of a second length based on the first parameter by comparing the second length and a first length set to be from a front end of the first slab to the first cutting position, the second cutter being located downstream of the first cutter, the first length being detected by the first sensor, the second length being detected by the second sensor,
wherein when the second length is equal to the first length or less than the first length, the arithmetic processing circuit sets the second slab to be fed to a next process without being cut by the second cutter,
wherein when the second length is greater than the first length, the arithmetic processing circuit generates a second parameter for setting a cutting position for the second cutter to further cut the second slab.

2. The cutting position control device according to claim 1, wherein
when the second length is greater than the first length, the arithmetic processing circuit determines whether or not a succeeding material of the second slab has a sufficient length to be taken up by a coiler after the second slab is subdivided at the first cutting position into a preceding material and the succeeding material, the succeeding material succeeding the preceding material,
when it is determined that the succeeding material has the sufficient length to be taken up by the coiler, the arithmetic processing circuit generates the second parameter so that the second slab is cut at the first cutting position, and
when it is determined that the succeeding material does not have the sufficient length to be taken up by the coiler, the arithmetic processing circuit feeds the second slab to the next process without cutting by the second cutter.

3. The cutting position control device according to claim 2, wherein
when it is determined that the succeeding material does not have the sufficient length to be taken up by the coiler, the arithmetic processing circuit determines whether or not the second slab has a sufficient length to be taken up by the coiler,
when it is determined that the second slab has the sufficient length to be taken up by the coiler, the arithmetic processing circuit feeds the second slab to the next process without cutting by the second cutter, and
when it is determined that the second slab does not have the sufficient length to be taken up by the coiler, the arithmetic processing circuit generates a third parameter for the second cutter to further cut the second slab, the third parameter being generated to set a third cutting position so that both of two materials after cutting the second slab at the third cutting position have sufficient lengths to be taken up by the coiler.

4. The cutting position control device according to claim 3, wherein
the sufficient length is determined based on a weight of the second slab.

5. The cutting position control device according to claim 4, wherein
the arithmetic processing circuit determines that the second slab has the sufficient length to be taken up by the coiler, under a condition that the weight of the second slab formed by the coiler is less than a predetermined value for transportation.

6. The cutting position control device according to claim 3, wherein
the third parameter is generated to set the third cutting position to cut the second slab at a half-length position.

7. The cutting position control device according to claim 2, wherein
the sufficient length is determined based on a predetermined length set to the coiler.

8. The cutting position control device according to claim 7, wherein
the arithmetic processing circuit determines that the succeeding material of the second slab has the sufficient length to be taken up by a coiler, under a condition that a length of the succeeding material of the second slab is greater than the predetermined length set to the coiler, the length of the succeeding material of the second slab being calculated by subtracting the second length from the first length.

9. The cutting position control device according to claim 1, wherein
the arithmetic processing circuit transmits second data to a higher-level system based on a third length of the second slab or a fourth length of the preceding material after the second slab or the preceding material has passed through the second cutter,
the third length and the fourth length are measured lengths, the higher-level system manages a production management database based on the production schedule and the material information of the material to be produced, and the second data is for updating the production management database.

10. The cutting position control device according to claim 1, wherein when the second length is equal to the first length or less than the first length, the second slab is taken up by a coiler without being cut by the second cutter.

* * * * *